US009813625B2

United States Patent
Nakajima

(10) Patent No.: US 9,813,625 B2
(45) Date of Patent: Nov. 7, 2017

(54) ROTARY SWITCH

(71) Applicant: Hidehiko Nakajima, Chiba (JP)

(72) Inventor: Hidehiko Nakajima, Chiba (JP)

(*) Notice: Subject to any disclaimer, the term of this patent is extended or adjusted under 35 U.S.C. 154(b) by 2 days.

(21) Appl. No.: 14/990,467

(22) Filed: Jan. 7, 2016

(65) Prior Publication Data

US 2016/0119543 A1    Apr. 28, 2016

Related U.S. Application Data

(63) Continuation of application No. 14/599,397, filed on Jan. 16, 2015, now Pat. No. 9,264,614, which is a
(Continued)

(30) Foreign Application Priority Data

Jul. 18, 2012    (JP) .................................. 2012-159132

(51) Int. Cl.
*H04N 5/232*    (2006.01)
*G03B 17/02*    (2006.01)
(Continued)

(52) U.S. Cl.
CPC ......... *H04N 5/23245* (2013.01); *G03B 17/02* (2013.01); *H01H 19/03* (2013.01);
(Continued)

(58) Field of Classification Search
CPC ............... H04N 5/232; H04N 5/23216; H04N 5/23225; H04N 5/23245; H04N 5/23296;
(Continued)

(56) References Cited

U.S. PATENT DOCUMENTS 4,634,250 A * 1/1987 Koiwai .................... G02B 7/10
                                                                396/63
2008/0218604 A1* 9/2008 Shikano ............... G02B 21/368
                                                                348/240.3

FOREIGN PATENT DOCUMENTS

JP          49-27439 U      3/1974
JP          49-65232 A      6/1974
(Continued)

OTHER PUBLICATIONS

Notice of Reasons for Refusal in JP Application No. 2016-132120, dated Sep. 14, 2016.
(Continued)

*Primary Examiner* — Roberto Velez
*Assistant Examiner* — Quan Pham
(74) *Attorney, Agent, or Firm* — Hauptman Ham, LLP

(57) ABSTRACT

A digital camera includes a rotary switch, a switching unit, and a switching unit. The switching unit switches between two states independently of a function other than functions assigned to the respective states of the rotary switch, the two states including a restricted state where rotation of the rotary switch is restricted with a clicking feel and a function of at least one of a shutter speed and an aperture as a function with discrete output values is related to the rotating operation of the rotary switch and a non-restricted state where rotation of the rotary switch is not restricted and a function of at least one of focusing, and a zoom magnification of a lens, and similar function as a function with continuous output values is related to the rotating operation of the rotary switch.

6 Claims, 9 Drawing Sheets

Related U.S. Application Data continuation of application No. PCT/JP2013/069228, filed on Jul. 14, 2013.

(51) Int. Cl.
*H01H 19/03* (2006.01)
*H01H 19/54* (2006.01)
*H04N 5/225* (2006.01)
*H04N 1/00* (2006.01)
*H01H 25/06* (2006.01)
*H01H 3/50* (2006.01)

(52) U.S. Cl.
CPC .......... *H01H 19/54* (2013.01); *H04N 5/2251* (2013.01); *H04N 5/2254* (2013.01); *H04N 5/232* (2013.01); *H04N 5/23216* (2013.01); *G03B 2217/002* (2013.01); *H01H 3/50* (2013.01); *H01H 25/06* (2013.01); *H04N 1/00397* (2013.01)

(58) Field of Classification Search
CPC .......... H04N 5/2251–5/2254; H04N 1/00397; H04N 3/50; G03B 17/02; G03B 2217/002; H01H 19/00–19/6355; H01H 21/42; H01H 21/50; H01H 25/06; H01H 25/065; H01H 1/16; H01H 2239/05; H01H 15/10; G05G 1/10; G06F 3/04847
See application file for complete search history.

(56) References Cited

FOREIGN PATENT DOCUMENTS

| | | | |
|---|---|---|---|
| JP | 50-144434 | A | 11/1975 |
| JP | 51-6104 | Y1 | 2/1976 |
| JP | 53-20935 | U | 2/1978 |
| JP | 62-181912 | U | 11/1987 |
| JP | 62-276520 | A | 12/1987 |
| JP | 63-83711 | A | 4/1988 |
| JP | 8-54675 | A | 2/1996 |
| JP | 9-21940 | A | 1/1997 |
| JP | 10-206719 | A | 8/1998 |
| JP | 2000-227537 | A | 8/2000 |
| JP | 2005-115167 | A | 4/2005 |
| JP | 2011-33795 | A | 2/2011 |

OTHER PUBLICATIONS

Notice of Reasons for Refusal in JP Application No. 2016-132120, dated Dec. 6, 2016.

Decision to Grant in JP Application No. 2016-132120, dated Dec. 26, 2016.

Opposition in JP Patent No. 6078861, mailed Aug. 30, 2017, for which an explanation of relevance is attached.

* cited by examiner

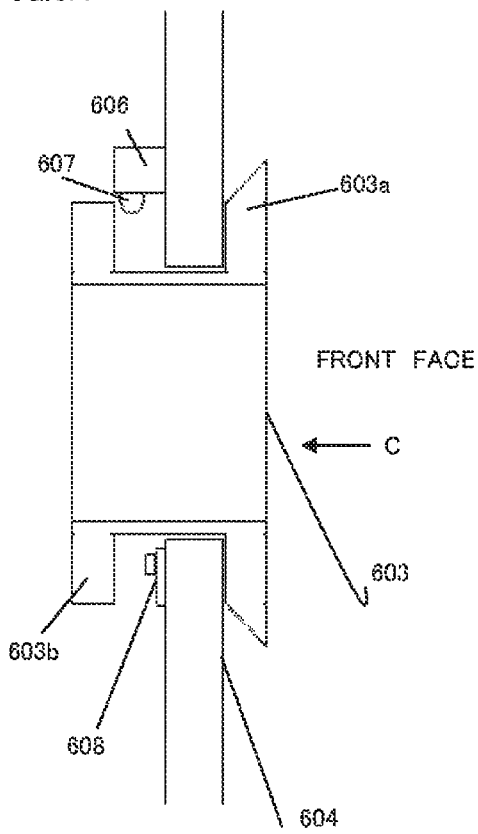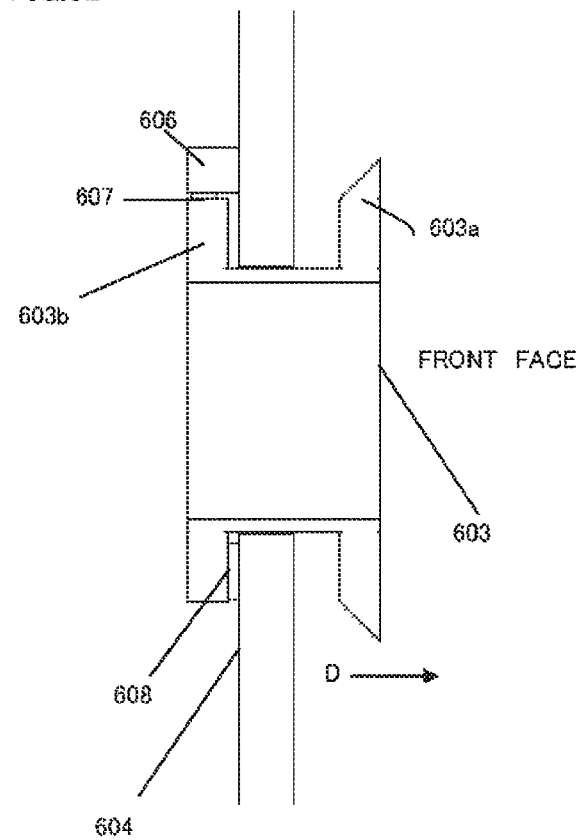

ROTARY SWITCH

CROSS-REFERENCE TO RELATED APPLICATION

This application is a continuation application and thus claims benefit pursuant to 35 U.S.C. §120, of U.S. patent application Ser. No. 14/599,397, which is a continuation application of International Patent Application PCT/JP2013/069228 filed on Jul. 14, 2013, which is based upon and claims the benefit of priority from the prior Japanese Patent Application No. 2012-159132, filed on Jul. 18, 2012, the entire contents of which are incorporated herein by reference.

TECHNICAL FIELD

The present invention relates to a switch that allows switching tactile senses for an electronic device, in particular, relates to a switch that allows achieving an output of discrete values and an output of continuous values by switching the outputs using one switch (dial) in a digital camera.

BACKGROUND ART

In recent years, digital cameras are becoming popular. The digital camera takes an image using an imaging device such as CCD and CMOS sensors, and saves image data of the taken image in a memory card built into the chassis. In these digital cameras, a lot of functions such as focusing, zooming, exposure, a shutter speed, ISO (sensitivity), and switching of imaging modes are electronically controlled.

Typically, the digital camera has a plurality of functions processed by a program, and needs many operations to select and set various items included in each function. For these operations, many external operating portions, for example, buttons are disposed on the surface of the chassis. However, when the external operating portions are disposed corresponding to the number of items or settings in each function, the number of components for the operating portions is increased. This causes a large-size chassis of the camera and complicated operations. Accordingly, there is an appropriate upper limit for the number of the external operating portions.

In the digital camera in the present situation, to realize multiple functions using a small number of buttons, on an operation screen, a plurality of hierarchies is set, multiple functions are realized using a combination of a plurality of buttons, and different functions for each mode are assigned to the same button.

Patent Document 1: JP-A-2004-69783
Patent Document 2: JP-A-2002-72051
Patent Document 3: JP-A-2002-101324

In the digital camera described in Patent Document 1, for example, the function of focusing is assigned to an endless circulation operating portion in an imaging mode, and the function of a frame-by-frame control is assigned in a playback mode.

In the video camera described in Patent Document 2, one rotary ring functions as a manual focus operation ring in a manual focus mode while functioning as a manual zoom operation ring when the mode is switched to an autofocus mode.

In the digital camera described in Patent Document 3, a plurality of functions is assigned to an operation dial. The instruction of the weakened or strengthened clicking feel during a turning operation of the operation dial in an imaging mode or a playback mode is given.

In the digital cameras in Patent Document 1, Patent Document 2, and Non-Patent Document 1, a plurality of functions is assigned to one operation ring and the operability of this operation ring is the same. In the digital camera in Patent Document 3, while the operating force amount is different, again, a plurality of functions is assigned to one operation dial with a clicking feel.

Through the observation by the inventor, the target values for the function to be set in the electronic device might be discrete values (or items) or continuous values. For example, as the function of the digital camera, the discrete values include a shutter speed, an aperture, an imaging scene (for example, a night scene or a portrait), and similar value. The continuous values include zooming, focusing, and similar value.

In the case where the control of the function to be targeted is controlled by a rotatable ring (or a dial) in a circular shape, it has been found that the operability is improved by use of a ring whose rotation is locked in a specific position when the discrete values are targeted and by use of a dial that continuously rotates when the continuous values are targeted.

However, in the conventional digital camera, when a ring is prepared corresponding to the output value of the function to be targeted. It is necessary to provide a plurality of types of rings in the digital camera. Depending on the provided type of the ring, the function to be assigned is limited. As a result, this has been causing limitations on the number, the arrangement, and the use feeling of the external operating portions.

SUMMARY OF INVENTION

According to one or more embodiments of the present invention, a lens-integrated digital camera includes a rotary switch, a switching unit, and a restricting member. The rotary switch is disposed at a main body. The rotary switch has a surface with a plurality of depressed portions or trough portions. The switching unit is configured to independently switch between two states. The two states include a restricted state where rotation of the rotary switch is restricted and a non-restricted state where rotation of the rotary switch is not restricted. The restricting member is configured to engage with the depressed portion or the trough portion of the rotary switch a case where the restricted state is set by the switching unit so as to restrict rotation of the rotary switch. At least one of a shutter speed and an aperture as a function with discrete output values is assigned to the restricted state, and at least one of focusing and a zoom magnification of a lens as a function with continuous output values is assigned to the non-restricted state. Further, a rotating operation of the rotary switch causes an output corresponding to a function assigned to a state selected by the switching unit to a digital camera system, and the digital camera system controls the discrete function or the continuous function corresponding to the output.

Furthermore, according to the lens-integrated digital camera, at least one of an exposure value, an imaging mode, an item of a function, frame-by-frame playback of images displayed in a list of photographed images, and a page turning when a photographed image is displayed, as functions with discrete output values can be further assigned to the restricted state. Additionally, at least one of functions with continuous output values like a magnification when a photographed display image is zoomed can be assigned to the non-restricted state.

Furthermore, in the non-restricted state, at least one of focusing and a zoom magnification of a lens is selectable, and in the restricted state, at least one of a shutter speed and an aperture is selectable.

Furthermore, the rotary switch is rotatably mounted in a peripheral area of a lens-barrel.

Furthermore, the switching unit enables switching from an operation screen.

Furthermore, the switching unit is configured to perform switching by an operation of pressing the rotary switch into a chassis side or pulling the rotary switch.

A lens-integrated digital camera includes a ring-shaped rotary switch, a selector switch, a restricting member, a display instrument, and a memory. The rotary switch is mounted on a main body in a peripheral area of a lens-barrel to be rotatable in the peripheral area of the lens-barrel. The rotary switch has a plurality of depressed portions in a surface portion that is not exposed to an outside of the camera in the rotary switch. The selector switch is disposed in a vicinity of the lens-barrel on a surface of a chassis. The selector switch is configured to independently switch between two states. The two states include a restricted state where rotation of the rotary switch is restricted and a non-restricted state where rotation is not restricted. The restricting member is configured to restrict rotation of the rotary switch by being biased by the depressed portion due to a pressing force of a spring, corresponding to a switching operation to the restricted state by the selector switch. The display instrument is configured to display a value corresponding to a function assigned to a state selected by the selector switch. The memory is configured to store a value corresponding to an original state before switching when the selector switch switches between the restricted state and the non-restricted state. At least one of a shutter speed and an aperture as a function with discrete output values is assigned to the restricted state. Besides, at least one of focusing and a zoom magnification of a lens as a function with continuous output values is assigned to the non-restricted state. Further, an operation of the rotary switch causes an output corresponding to a function assigned to a state selected by the selector switch to a digital camera system, and a control of the discrete function or the continuous function corresponding to the output is performed in the digital camera system.

An electronic device includes a rotary switch, a switching unit, and a restricting member. The rotary switch is disposed at a main body. The switching unit is configured to independently switch between: a restricted state where an operation of the rotary switch causes a clicking feel; and a non-restricted state where an operation of the rotary switch does not cause a clicking feel. The restricting member is configured to give a clicking feel in rotation of the rotary switch by a plurality of fitting structures that allows transition and is disposed between the restricting member and the rotary switch, in a case where the restricted state is set by the switching unit. A function with discrete output values is assigned to the restricted state, and a function with continuous output values is assigned to the non-restricted state. Further, an operation of the rotary switch causes an output corresponding to a function assigned to a state selected by the switching unit to an electronic device system, and a function with a continuous output or a function with a discrete output corresponding to the output is controlled in the electronic device system.

According to one or more embodiments of the present invention, functions corresponding to both discrete values and continuous values can be applied to one switch. This allows reducing the number of buttons. In the case where one or more embodiments of the present invention is provided to the peripheral area of a lens-barrel so as to switch shutter speeds and exposure values, handling is the same as that of a conventional lens with an adjusting mechanism for both functions. This ensures the compatibility between convenience and downsizing.

BRIEF DESCRIPTION OF THE DRAWINGS

FIGS. 6A and 6B are conceptual diagrams illustrating the main part of the second embodiment where the present invention is applied to a digital camera.

DESCRIPTION OF PREFERRED EMBODIMENTS

Embodiment 1

Figure 1A:
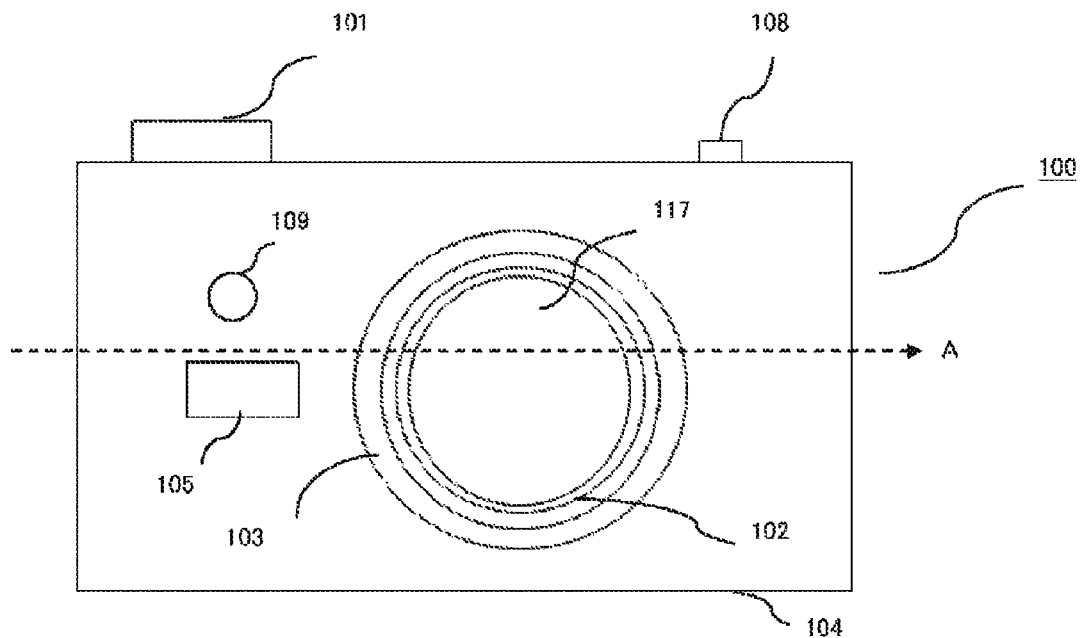
FIGS. 1A and 1B are schematic configuration diagrams illustrating a first embodiment where the present invention is applied to a digital camera.
Figure 1B:
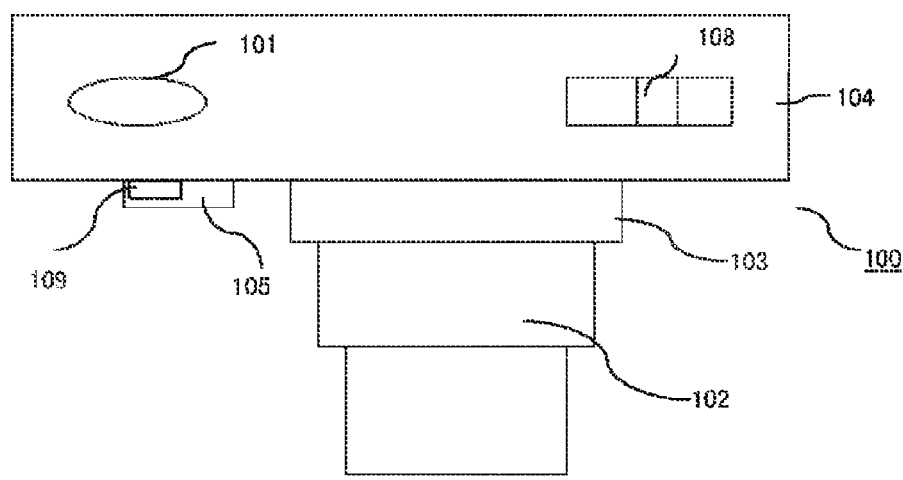

FIGS. 1A and 1B illustrate a first embodiment of the present invention. FIG. 1A illustrates a front view of a digital camera according to the first embodiment. FIG. 1B illustrates a top view of the digital camera according to the first embodiment. With reference to FIG. 1A, a rotary ring 103 as a feature of the present invention is disposed in a front face portion of a digital camera 100 so as to rotatable at the outer periphery of a lens-barrel 102 including a lens 117 for taking an image in a chassis 104 of a digital camera 100. A selector switch 105 for switching a mode for continuous or discrete output values in the rotary ring 103 is disposed in the vicinity of the rotary ring 103. Furthermore, a shutter 101 for photographing, a power switch 108 for switching ON/OFF of a power supply, an imaging mode, or a playback mode, and a function button 109 for further mode switching are disposed on the outer surface of the chassis 104. Other photographing mechanisms and similar member are the same as those in the conventional digital camera, and will not be further elaborated here. Here, the discrete values do not only mean that the actual output values from an encoder are discrete, but also include discrete values (for example, an aperture F-number, a shutter speed, and similar value) that are recognized as a computation result by a user.

Figure 2A:
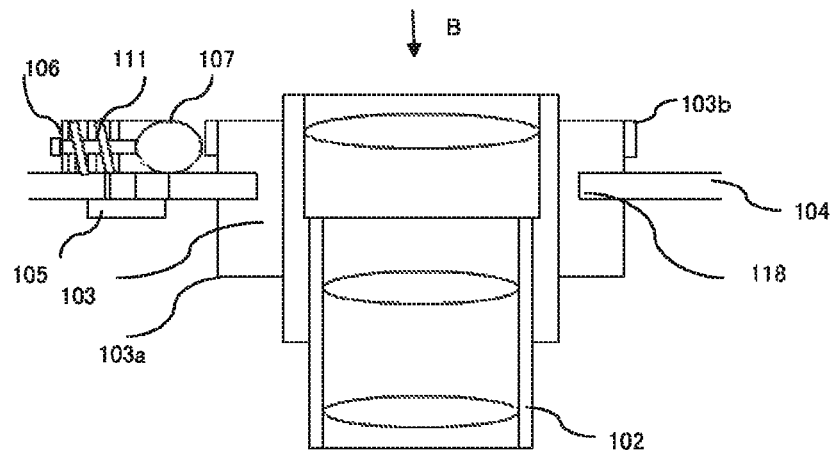
FIGS. 2A to 2D are conceptual diagrams illustrating the main part of the first embodiment.

FIG. 2A illustrates a part of the cross section cut along the line (a dashed arrow A in FIG. 1A) passing through the center portion of the lens-barrel 102 on the front face side of the digital camera 100. The rotary ring 103 is set to be smoothly rotated by a rotation mechanism 118, here, a ball bearing disposed between the rotary ring 103 and the chassis 104. The rotation angle, the rotation direction, and the rotation speed of the rotary ring 103 are detected by a rotary encoder (not illustrated) disposed at the rotary ring 103. Here, the detections of the rotation angle and the rotation direction or similar detection may employ well-known other methods. Here, a usable method for fixing the lens-barrel 102 to the chassis 104 can be simply designed by a method well-known to those skilled in the art, and will not be further elaborated here. Within the chassis of the selector switch 105, a fixed portion 106 coupled to the selector switch 105, a restricting portion 107 coupled to the fixed portion 106 via a spring 111, and means (not illustrated) for fixing the position of the selector switch 105 (and the fixed portion 106) during switching is disposed.

Figure 2B:
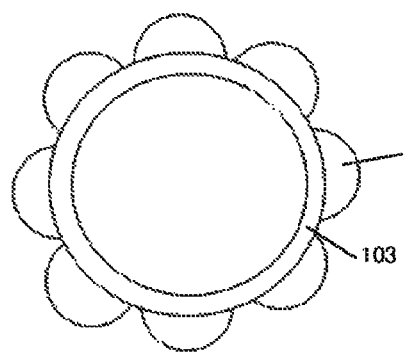
Figure 2C:
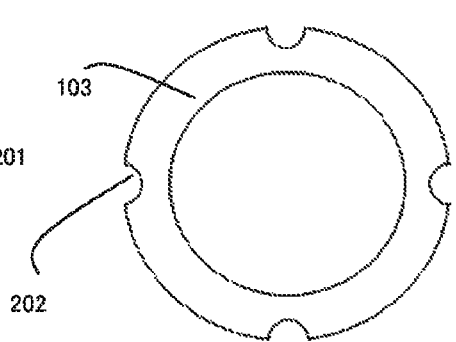
Figure 2D:
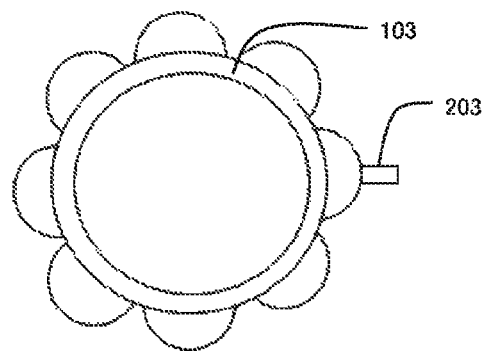

FIG. 2B to FIG. 2D illustrate structures of the rotary ring 103 viewed from the inside of the chassis (in an arrow B direction in FIG. 2A). At an outer periphery 103b of the rotary ring 103, projecting portions 201 in circular shapes are evenly disposed. When the selector switch 105 is in a non-restricted state (in this case, the output values are analog or continuous values), the user can rotate the rotary ring 103 via an outer periphery 103a without particular restriction on the rotating state of the rotary ring 103.

Figure 3A:
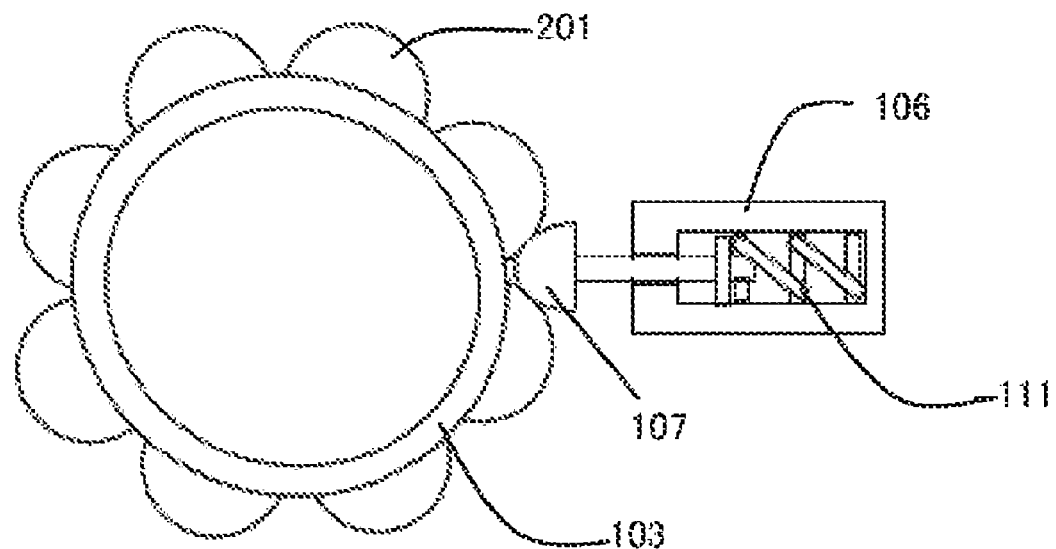
FIGS. 3A and 3B are conceptual diagrams illustrating a restriction mechanism according to a second embodiment.
Figure 3B:
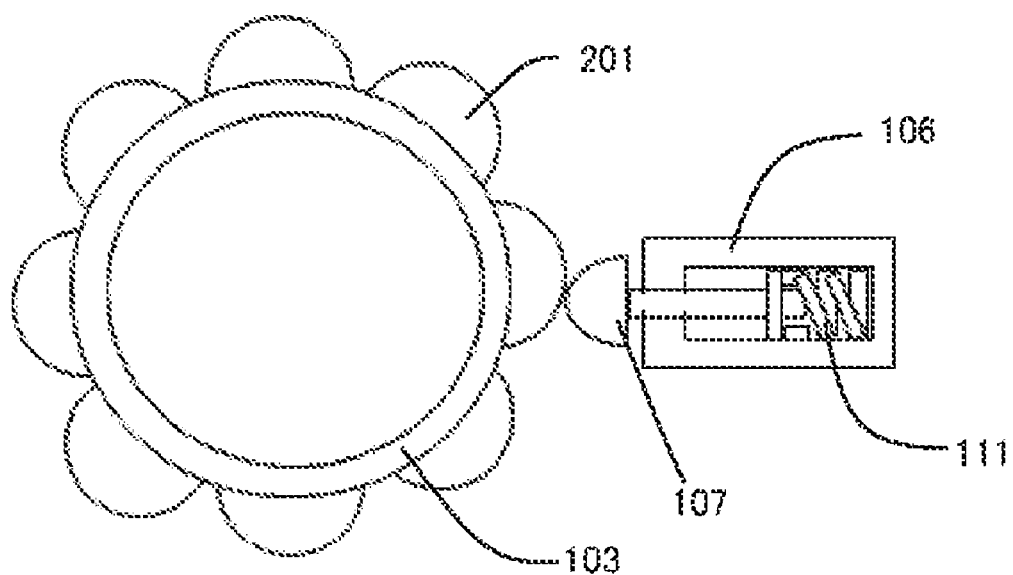

FIG. 3A and FIG. 3B are respective conceptual diagrams illustrating the operation when the selector switch 105 is set to a restricted state (in this case, the output values are digital or discrete values). In conjunction with movement of the selector switch 105, the fixed portion 106 moves to approach the rotary ring 103 inside the chassis 104. The fixed portion 106 includes the restricting portion 107 that is projected by the spring 111. When the rotary ring 103 is rotated, the rotary ring 103 is fixed in a rough position between the projecting portions 201 FIG. 3A. When the restricting portion 107 has a positional relationship other than the trough with respect to the projecting portions 201 like FIG. 3B, a restriction is imposed such that the restricting portion 107 moves to the closest trough position by the pressing force of the spring 111 disposed between the fixed portion 106 and the restricting portion 107. Causing the clicking feel to the user when the restricting portion 107 is positioned in this trough position improves the convenience of the user. The shapes of the distal end of the restricting portion 107 and the projecting portion 201 employ the circular shapes as an example. However, any structure is possible insofar as the rotary ring 103 is rotatable and the restricting portion 107 can be arranged in the trough position in the structure. When the restricted state and the non-restricted state are switched by the selector switch 105, the last output value in the original state is stored in a memory as a value of the original state and the output value from the rotary encoder of the rotary ring 103 is output as the output value of the function corresponding to a new function.

FIG. 2C illustrates a modification of the rotary ring 103. In this example, depressed portions 202 are discretely disposed at the outer periphery 103b of the rotary ring 103. In this case, the rotary ring 103 rotates continuously in the portion where the depressed portion 202 and the restricting portion 107 are not in contact with each other during rotation. In the portion where the depressed portion 202 and the restricting portion 107 are in contact with each other, the restricting portion 107 is fixed in the most stable position against the pressing force of the spring. As the application of this modification, discrete values in the positions of the depressed portions 202 and continuous values between the depressed portions 202 may be output as output values.

While in FIG. 2C the depressed portions 202 are discretely disposed on the outer periphery 103b, the depressed portions 202 may be disposed evenly adjacent to one another at the outer periphery of the rotary ring 103. While in FIG. 2B the projecting portions 201 are disposed evenly adjacent to one another at the outer periphery of the rotary ring 103, the projecting portions 201 may be discretely disposed at the outer periphery 103b of the rotary ring 103. The designer may freely design the configuration among these configurations corresponding to the function applied to the rotary ring 103. The intervals between the adjacent depressed portions 202 or projecting portions 201 can become gradually large or gradually small corresponding to the applied function such that the operator can intuitively operate the applied function. Furthermore, the configuration where a part of the projecting portions 201 can be housed within the rotary ring 103 not to be in contact with the restricting portion 107 may be employed such that the intervals can be adjusted by an operation of the user or by a program built into the digital camera.

While in the above-described embodiment the selector switch 105 is the switch that functions by a mechanical operation, the present invention is not limited to this. It is possible to employ the configuration where switching is set from an operation setting screen of the digital camera. As one example of this case, the selector switch 105 is not disposed on the front face of the digital camera 100 while an actuator for moving the fixed portion 106 or similar member is disposed within the chassis 104. The actuator is operated corresponding to the mode set on the setting screen, so as to move the restricting portion 107 to a restricting position or a non-restricting position of the rotary ring 103. Separately from the setting on the setting screen, it is possible to employ the configuration where this actuator control is operated by a button or similar member disposed outside.

Furthermore, depending on the function to be applied, it might be preferred to have a limitation on the rotation direction (for example, the case where aperture values are written at the outer periphery of the rotary ring 103 and where the minimum F-number and the maximum F-number are adjacent to each other). In this case, it is possible to employ the configuration to avoid a trouble by a method where a protrusion 203 is simply disposed at the outer periphery of the rotary ring 103 and this protrusion is brought into contact with the fixed portion 106 so as to restrict further rotation, or by the following configuration. For example, means for detecting the rotation direction of the rotary ring 103 is disposed. If further rotation causes a trouble with the output value, when further rotation in the direction where a trouble occurs is detected, the fixed portion 106 is brought closer to the rotary ring 103 such that the restricting portion 107 cannot climb over the projecting portion 201. Rotation restricting means is not limited to the configuration in this embodiment, and may employ another well-known method.

In this embodiment, the discrete values include shutter speeds, exposure values, imaging modes, items of the function, frame-by-frame playback of images displayed in a list of photographed images, page turning when photographed images are displayed, and similar value. The items of the function or similar value may be changed in combination with another button or similar member. The continuous values include focal positions, zoom magnifications of the lens, magnifications when a photographed display image is zoomed, and similar value. Further, as discrete values, it is possible to use the case where the zoom magnifications of the lens are steps like ×2, ×4, and ×10, the case where the zoom magnifications of display are steps, and similar case.

Figure 4:
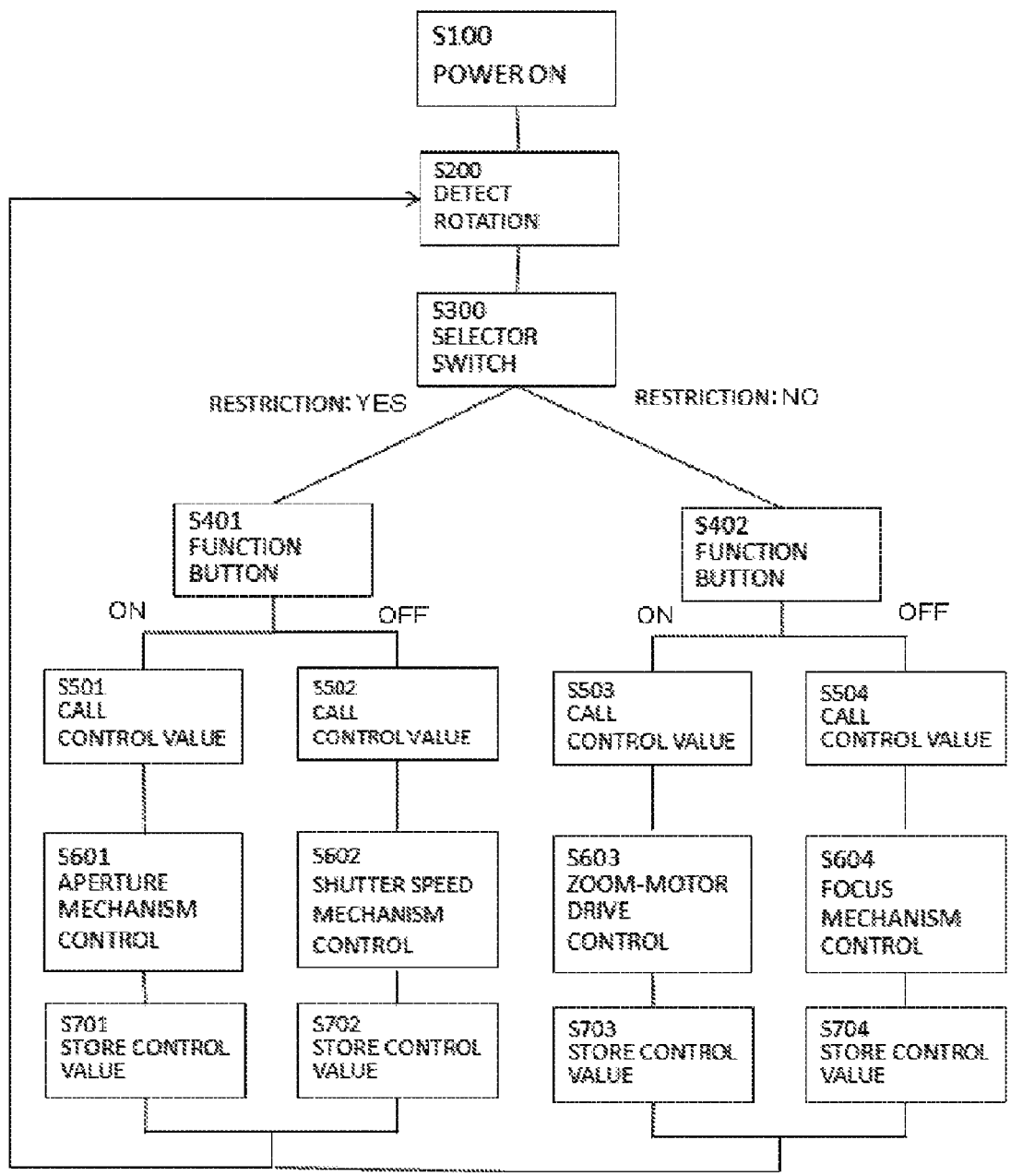
FIG. 4 is a flowchart illustrating an operation according to the first embodiment.

Next, a description will be given of an actual operation example using FIG. 4. Firstly, the power supply is turned on by the power switch 108 (in S100). Next, the rotating state of the rotary ring 103 is detected (in S200). Subsequently, regarding the rotation angle, the rotation speed, the rotation amount, and similar parameter when the rotation is detected, the needed value is measured. Subsequently, the state of the selector switch 105 is detected (in S300), and then the state of the function button 109 is detected (in S401 and S402). In the case where bath the selector switch 105 and the function button 109 are set, the digital camera 100 determines that the function of the rotary ring 103 is the "aperture." Then, the current value related to the aperture value is read out from the memory (in S501). In the case where this operation is the first operation, an initial value is stored in the memory. Subsequently, an aperture mechanism is controlled corresponding to the output value of the rotary ring 103 (in S601). Subsequently, the changed aperture value is stored in the memory (in S701). Then, the digital camera system causes the control to proceed to S200 for detecting rotation of the rotary ring. The digital camera system controls a shutter speed control (in S502 to S702), a zoom-motor drive control (in S503 to S703), and a focus mechanism control (in S504 to S704) corresponding to the states of the selector switch and the function button, similarly to the aperture mechanism control. In the case where the discrete values are stored, not the values calculated from the encoder disposed at the rotary ring hut the discrete values computed from the calculated values (for example, F-numbers of F1.4, F2, F3.5, F4, F5.6, F8, and similar value in the case of the aperture) are stored. In the case where continuous values are switched to discrete values, the positions where the restricting means is inserted are computed corresponding to the stored discrete values. In the case where continuous values are stored, the values that are calculated from the encoder disposed at the rotary ring and correspond to the function are stored. In the case where discrete values are switched to continuous values, the positions where the restricting means is pulled are set to the positions of the values stored in storage means. Here, one function button is disposed. However, the function button can be removed corresponding to the number of functions. Furthermore, a plurality of function buttons may be disposed. At this time, the aperture, the shutter speed, the zooming, and the focusing are assigned as the respective functions. Needless to say, the function to be assigned can be designed as necessary. Displaying the currently assigned function together with the output value of the currently assigned function on a finder or a liquid crystal display instrument s convenient for the user to easily recognize the current function assigned to the ring.

Figure 5:
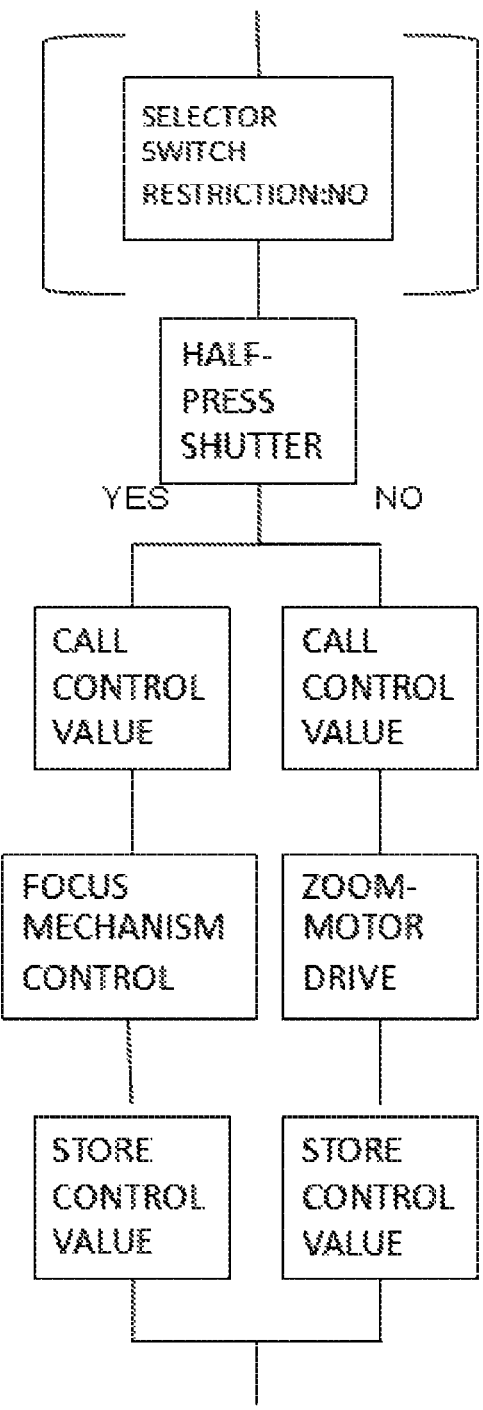
FIG. 5 is a flowchart illustrating an operation according to a modification of the first embodiment.

Next, a modification of the process described in FIG. 4 will be described in FIG. 5. In recent years, a DMF (direct manual focus) function has been adopted to digital cameras that employ autofocus. In the DMF function, autofocus operates by half-pressing the shutter 101 and the user finely adjusts the focus by manual operation after autofocusing is done. In the process in the diagram, even in the case where the zoom function is originally assigned to the rotary ring, when half-pressing of the shutter is detected in the control sequence, the control is performed as if the function assigned to the rotary ring is the focus function. In the case where the selector switch is electronically controlled, the function of the rotary ring may employ, for example, the focus function as described above regardless of the state of the selector switch when the shutter half-pressing is detected (in the case where the focus function is assigned, it is convenient to remove the restriction regardless of the state of the selector switch as a setting). With this embodiment, a plurality of functions can be assigned to the operation ring disposed in the outer peripheral portion of the lens-barrel. This allows achieving the operational feeling equal to that of a conventional single-lens reflex camera, thus allowing intuitive operation by the user.

Embodiment 2

FIGS. 6A and 6B illustrate the outline of the main part according of a second embodiment according to the present invention. In the diagram, only a part of a chassis 604 and the main configuration of a rotary ring 603 on the front face of a digital camera are illustrated, and the other configurations such as a lens are omitted. In this embodiment, the rotary ring 603 is disposed in the front face portion of the chassis 604. The rotary ring 603 is configured to be rotatable and movable back and forth in the whole panel of the chassis 604. In an ordinary state, the rotary ring 603 is pressed toward the inside of the chassis 604 (as illustrated by an arrow C) by a spring (not illustrated) or similar member. In this embodiment, a restricting portion 607 is fixed while being pressed by a spring to approach the rotary ring 603.

In the ordinary state, as illustrated in FIG. 6A, an inside peripheral edge 603b is not in contact with the restricting portion 607. Accordingly, the rotation of the inside peripheral edge 603b is not restricted. The user can continuously rotate the rotary ring 603. For a transition to a restricted state, as illustrated in FIG. 6B, the user firstly performs the operation for pulling an outside peripheral edge 603a of the rotary ring 603 from the chassis 604 in an arrow D direction. At this time, a switch of a detection switch 608 is pressed. Accordingly, the camera system recognizes that the user performs a pulling operation and then the pulling operation for the restricted state is performed. This pulling operation causes the inside peripheral edge 603b and the restricting portion 607 to fit each other. The restriction mechanism between the inside peripheral edge 603b and the restricting portion 607 can be performed similarly to Embodiment 1 described above. Another well-known restriction mechanism may be used. Here, disposing a taper whose diameter shrinks toward the chassis 604 in the outside peripheral edge 603a is convenient for the user to easily pull the rotary ring 603. Also, to easily cause the restricting portion 607 and the inside peripheral edge 603b to fit each other, it is convenient to dispose a taper in one of these portions or in the contact portion between both the portions.

Embodiment 3

FIGS. 7A to 7D illustrate conceptual diagrams of a third embodiment according to the present invention. A rotary dial 703 according to the present invention is disposed in the vicinity of a liquid crystal display portion 701 on the back face of a digital camera. In the center of the rotary dial 703, a button 709 for determining an operation is disposed. A restricted state and a non-restricted state can be switched by pressing the surface of the rotary dial 703 in the inward direction (illustrated by an arrow E) of a chassis 704.

Figure 7A:
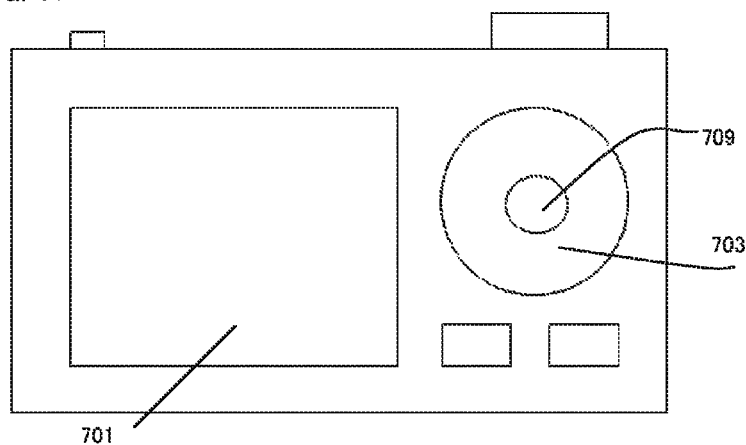
FIGS. 7A to 7D are schematic configuration diagrams illustrating a third embodiment where the present invention is applied to a digital camera.
Figure 7B:
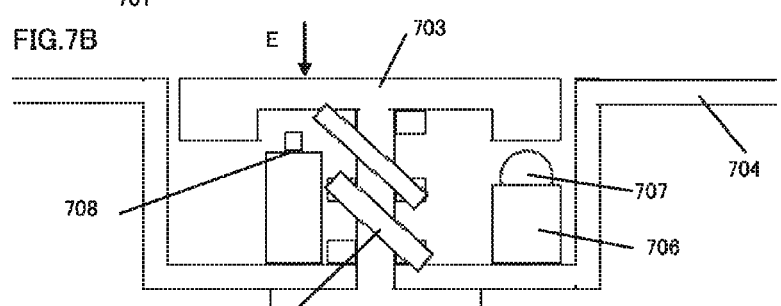
Figure 7C:
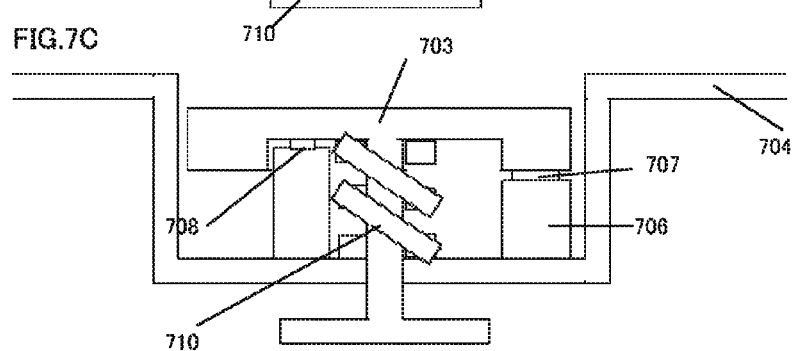
Figure 7D:
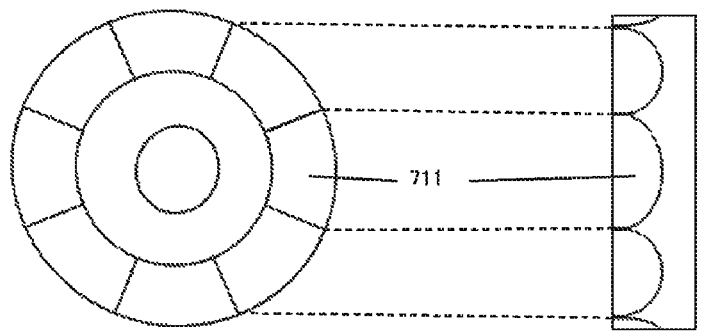

A description will be given of the operation of the rotary dial 703 in this embodiment with reference to FIG. 7A to FIG. 7D. FIG. 7A illustrates one surface where the rotary dial 703 is arranged in the camera. FIG. 7B illustrates the configuration of the rotary dial 703 in an ordinary state. The rotary dial 703 is fixed to the chassis 704 via a spring 710 such that the rotary dial 703 can be pressed into the chassis 704. Near the inferior surface of the rotary dial 703, a restricting portion 707 and a fixed portion 706 are disposed. In the ordinary state, the restricting portion 707 is not in contact with the rotary dial 703. The fixed portion 706 is fixed to the chassis 704 to press the restricting portion 707 in the direction toward the rotary dial 703 via a spring. Then, the user presses the rotary dial 703 into the chassis 704 (in the arrow E direction). Accordingly, the rotary dial 703 becomes the restricted state. On the surface of the rotary dial 703 on the restricting portion 707 side when viewed from the side portion (see FIG. 7C), depressed portions 711 are disposed like FIG. 7D. Depression of the rotary dial 703 causes the restricting portion 707 and the depressed portion 710 to fit each other as illustrated in FIG. 7C. During rotation of the rotary dial 703, the restricting portion 707 moves between the adjacent depressed portions 710 in the direction vertical to the arrow E while being expanded and contracted by the spring. Accordingly, the restricting portion 707 transitions between discrete states. In the state where the rotary dial 703 is depressed, a detector 708 is in an on-state and the camera system detects the restricted state of the rotary dial 703. While in this embodiment the restricting portion 707 is constituted in contact with the inferior surface of the rotary dial 703 in one position, the restricting portion 707 may be constituted in contact with the inferior surface of the rotary dial 703 in a plurality of positions. In this case, it is convenient to symmetrically arrange the restricting portion 707.

Figure 8A:
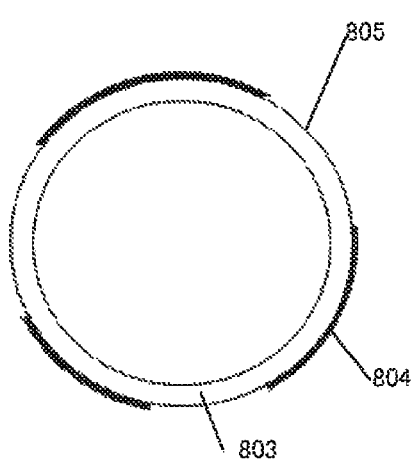
FIGS. 8A and 8B are examples of a control ring, to which the present invention is applicable, for a digital camera.
Figure 8B:
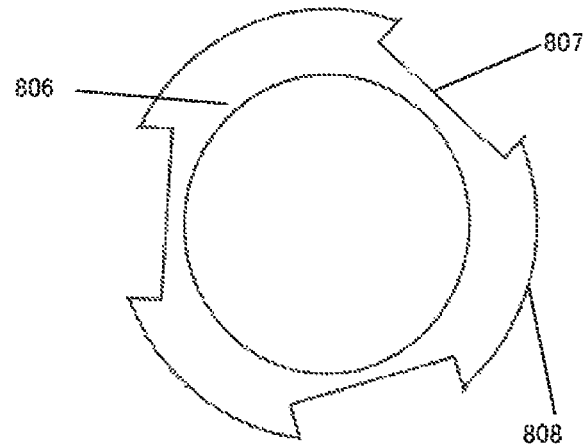

FIGS. 8A to 8B illustrate another example of the rotary ring used for a digital camera. In FIG. 8A, a pressure sensitive touch sensor is provided in a part (bold line part) 804 of the outer periphery of a rotary ring 803. In FIG. 8B, an electrostatic touch sensor is provided in a depressed portion 807 of a rotary ring 806. In the case where a plurality of functions is assigned to the rotary ring, it is necessary to perform an operation using the rotary ring and the function button in combination. However, when the camera is held with both hands, it is necessary to release the holding hand to depress the button for exerting the function by the combination. Therefore, shaking of the camera occurs and then the photographing quality deteriorates as a result. Since the function button in this embodiment is disposed as a part of the ring, it is not necessary to release the holding hand and there is no possibility of reduction in photographing quality. Compared with the case where the button s disposed in the ring, there are fewer causes of shaking, for example, depression. Thus, this configuration is excellent. For applications of this function, it is possible to employ the configuration where functions of: zooming at a first speed and zooming at a second speed when the touch sensor is ON; continuous zooming and step zooming when the touch sensor is ON; zooming and a focus control when the touch sensor is ON; (continuous) focusing and step focusing (using discrete focus positions of 50 cm, 1 m, 3 in, 10 m, ∞, and similar position) are assigned to the rotation of the rotary ring. Here, a touch sensor in another example of this touch sensor is used as the selector switch of the present invention. Accordingly, for example, in the case of FIG. 8A, when an outer periphery 805 of the rotary ring 803 is rotated, discrete values, for example, a change in aperture value can be assigned. In the case where a rotation is caused while a force with a certain value or more is applied to the outer periphery 804 with the pressure sensitive touch sensor, continuous values, for example, the focus control can be assigned. In the case of FIG. 8B, when an outer periphery 808 of the rotary ring 806 is rotated, discrete values, for example, a change in aperture value can be assigned. In the case where a rotation is caused while the outer periphery 807 with the electrostatic touch sensor is touched, continuous values, for example, the focus control can be assigned. The width of this outer periphery 807 can be set to, for example, the width (about 3 mm to 10 mm) and the depth (about 1 to 5 mm) to the extent that the skin of the finger touches the touch sensor when holding is strong in order to prevent unwanted operations.

Embodiment 4

Figure 9A:
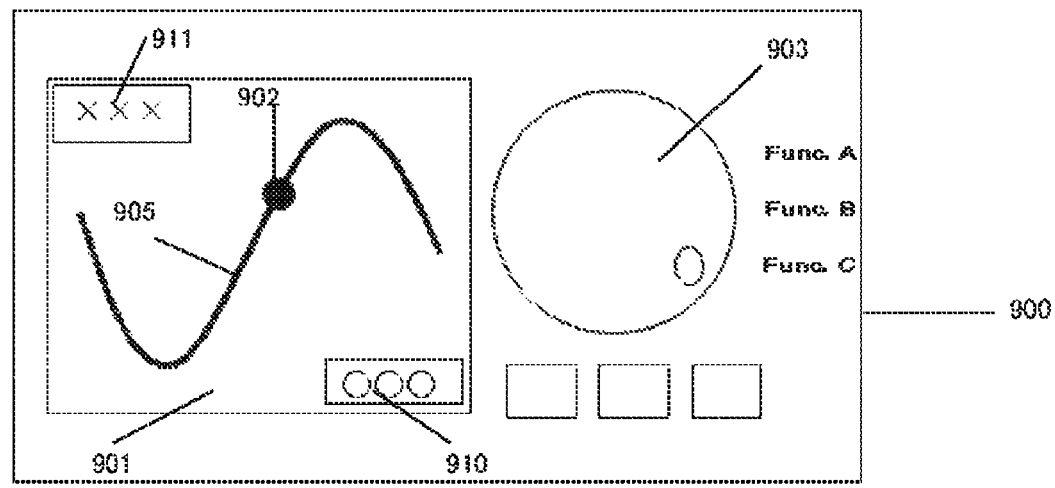
FIGS. 9A to 9C are diagrams illustrating a fourth embodiment where the present invention is applied to a waveform monitor.
Figure 9B:
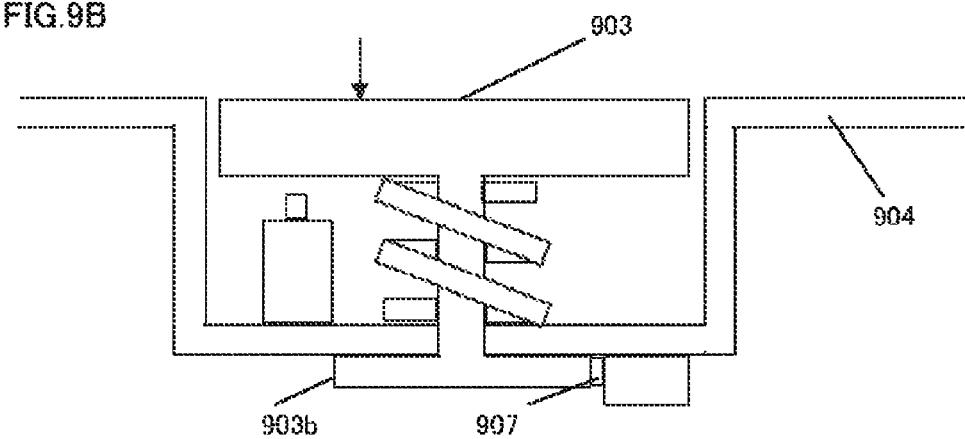
Figure 9C:
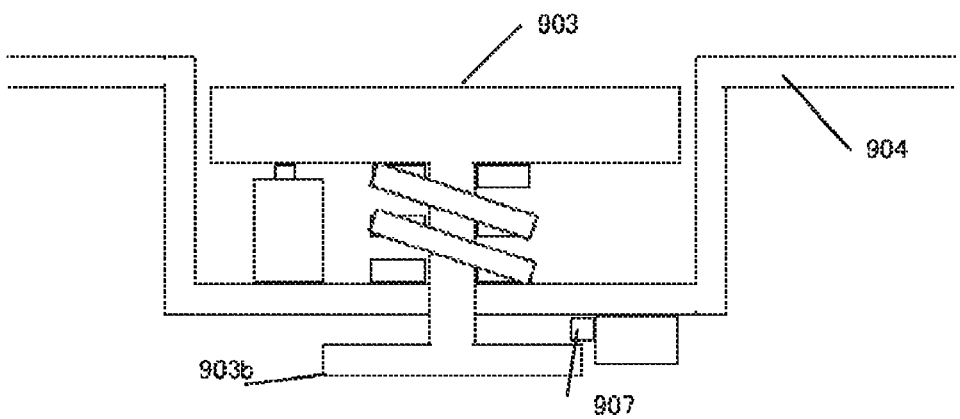

FIGS. 9A to 9C illustrate a fourth embodiment of the present invention. This embodiment is an example where the rotary dial of the present invention is applied to a waveform monitor 900. In this embodiment, in an ordinary state, an inside peripheral edge 903b of the rotary dial 903 and a restricting portion 907 fit each other. As a discrete state, any function of measuring functions A and B and a result display function C is selected. On the other hand, in the case where a rotary dial 903 is depressed, this fitting state is released and continuous rotation is allowed. For example, in the state where the function of the waveform monitor 900 illustrated in FIG. 9A is set to the display function C, a measurement data curve 905 measured in the past is displayed on a liquid crystal display instrument 901. Regarding any point of this curve, an x-coordinate value 910 is displayed at the lower right side of the display instrument and a y-coordinate value 911 is displayed at the upper left side of the display instrument. On the displayed waveform, any point is displayed with a black circle 902. Rotating the rotary dial 903 in a depressed state allows moving the displayed point 902 on the curve.

The rotary rings to be disposed at a camera main body have been described as examples of the rotary ring according to the present invention.

While the embodiments of the present invention have been described above, modifications within the scope of the present invention are included in the present invention. The above-described embodiments are only embodiments, and modifications by mutually recombining the configurations of the respective embodiments or similar modification are included in this application.

INDUSTRIAL APPLICABILITY

Functions that output different types of (continuous or discrete) values can be assigned to a switch where a tactile sense during rotation is switchable and that is mounted on a chassis. This allows achieving reduction in number of components and in size of the chassis. As a result, this switch is applicable to the use in which downsizing and reduction of operating portions are essential.

DESCRIPTION OF REFERENCE SIGNS 100 digital camera
101 shutter
102 lens-barrel
103 rotary ring
103b outer periphery
104 chassis
105 selector switch
106 fixed portion
107 restricting portion
108 power switch
109 function button 117 lens
118 rotation mechanism
111 spring
201 projecting portion
202 depressed portion
603 rotary ring
604 chassis
606 fixed portion
607 restricting portion
703 rotary dial
706 fixed portion
707 restricting portion
710 spring
803 rotary ring
804 pressure sensitive touch sensor portion
805 outer periphery
806 rotary ring
807 electrostatic touch sensor portion
808 outer periphery
900 waveform monitor
901 liquid crystal display instrument
903 rotary dial
905 data curve
907 restricting portion
910 x-coordinate value
911 y-coordinate value

The invention claimed is:

1. A digital camera, comprising:
a rotary switch rotatably mounted in a peripheral area of a lens barrel, wherein the rotary switch has a plurality of depressed/trough portions concentrically arranged with respect to an axis of rotation of the rotary switch, a photographing function is assigned to the rotary switch, the rotation of the rotary switch is detected, a value is outputted based on a detected rotation of the rotary switch, and the photographing function is controlled based on the value;
a restricting member comprising a mechanical structure configured to press against the depressed/trough portions in of the rotary switch, and selectively engages with the depressed/trough portions during rotation of the rotary switch for generating a clicking feel; and
a selector switch comprising a coupling mechanism configured to adjust a force applied by the restricting member against the depressed/trough portions for switching between a restricted state with the clicking feel and a non-restricted state free of the clicking feel at a time of photographing wherein the rotary switch is configured to rotate without exerting mechanical control over a mechanism separate from the rotation and the selector switch.

2. The digital camera according to claim 1, wherein the axial direction is parallel to an optical axis of the digital camera at a direction extending internally from a rear side of the digital camera, and the restricting member is inserted into the depressed/trough portions along the axial direction.

3. The digital camera according to claim 1, further comprising a state detection switch configured to detect a selected state based on a position of the selector switch.

4. The digital camera according to claim 1, wherein the photographing function is an aperture or a focus.

5. The digital camera according to claim 1, wherein the mechanical structure comprises a coiled spring configured to press a contact point against the depressed/trough portions.

6. The digital camera according to claim 1, wherein the digital camera is a lens-integrated type camera.

* * * * *

(12) POST-GRANT REVIEW CERTIFICATE (171st)
United States Patent
Nakajima

(10) Number: US 9,813,625 J1
(45) Certificate Issued: Mar. 2, 2021

(54) ROTARY SWITCH

(71) Applicant: Hidehiko Nakajima

(72) Inventor: Hidehiko Nakajima

Trial Number:

PGR2018-00090 filed Aug. 6, 2018

Post-Grant Review Certificate for:

Patent No.: 9,813,625
Issued: Nov. 7, 2017
Appl. No.: 14/990,467
Filed: Jan. 7, 2016

The results of PGR2018-00090 are reflected in this post-grant review certificate under 35 U.S.C. 328(b).

POST-GRANT REVIEW CERTIFICATE
U.S. Patent 9,813,625 J1
Trial No. PGR2018-00090
Certificate Issued Mar. 2, 2021

AS A RESULT OF THE POST-GRANT REVIEW PROCEEDING, IT HAS BEEN DETERMINED THAT:

Claims 1-6 are cancelled.

\* \* \* \* \*